3,519,410
PROCESS FOR ELECTRICALLY INCREASING THE ISOTROPY OF VITREOUS SILICA

Gordon Hetherington, Tynemouth, North Shields, and John Alexander Winterburn, Cullercoats, North Shields, England, assignors to Thermal Syndicate Limited, Wallsend, Northumberland, England, a British company
No Drawing. Filed Nov. 10, 1966, Ser. No. 593,332
Claims priority, application Great Britain, Nov. 10, 1965, 47,631/65
Int. Cl. C03b *29/00;* C03c *1/00*
U.S. Cl. 65—62                               7 Claims

ABSTRACT OF THE DISCLOSURE

A method for improving the isotropy of vitreous silica. The sample of vitreous silica to be treated is heated to a temperature between 950° and 1250° C. An alternating electric field is then applied to the sample of silica. The frequency of the alternating electric field is within the range of 1 cycle per second and 1000 cycles per second, whereas the field strength exceeds 900 volts (R.M.S.) per centimeter.

---

This invention relates to a method of improving the isotropy of vitreous silica and in particular, though not exclusively, relates to a method of improving the properties of vitreous silica for use in ultrasonic work.

There are many applications in electric circuitry where the need arises to be able to delay momentarily, one signal relative to another, and for this purpose, it is known to use a delay line.

One particular form of delay line works on the principle of using the signal to be delayed to generate a mechanical vibration (e.g. by means of the piezoelectric effect), transmitting the vibration along an acoustic transmission member and then converting the vibration, when it arrives at the other end of the transmission member, back into a further electrical signal. It will be appreciated that for the vibration to be transmitted with the minimum of distortion, the transmission member should be as isotropic as possible.

One suitable material for the transmission member is amorphous vitreous silica and considerable research and study has gone into the investigation of methods of manufacturing more uniform vitreous silica. Methods are available for producing vitreous silica of extremely high purity (e.g. by oxidising suitable volatile silicon compounds in a high temperature gas stream), but it has been found that by and large, even carefully produced vitreous silica benefits from further processing if it is to be employed for ultrasonic delay line work.

It has been suggested, that it is impurity centres in the mass of vitreous silica which cause scattering and absorption of acoustical energy transmitted through the material, and proposals have been made to subject a heated piece of vitreous silica to a unidirectional electrostatic field and thus effect migration of the charged impurity centers to the edges of the silica piece. That migration of such impurity centres does occur, can be seen by an increase in the concentration of such impurity ions in the vicinity of the electrodes used for applying such fields and that improved performance is obtained with electrolysed material is well known in the art.

We believe that the parameters in which non-uniformity is most likely to effect the acoustical transmission properties of vitreous silica material, are the eleastic moduli and the density, and we also believe that although these parameters will be locally affected by the presence of impurity ions (and that improvement is to be expected following impurity ion removal), they will also be affected by the degree of orientation of the silica chains within the piece of silica. The effect of applying a unidirectional field is to introduce increased "order" in the material by orienting some of the silica chains, but because of this orientation, the treated material is not isotropic, i.e. the elastic moduli and density will be different in different directions through the material. The use for the transmission of acoustic vibrations, of vitreous silica material which has been electrolysed in a unidirectional field, is thereby limited to transmission in the direction of chain orientation, and further, since the desired direction of propagation may not be within one plane, the anisotropic nature of D.C. treated material is generally disadvantageous.

We have now found that by employing an alternating electric field instead of a unidirectional field, the degree of disorder of the silica chains may be increased and it is possible to approach completely random orientation of the silica chains throughout a piece of the material. The use of this treated material for the transmission of acoustic vibrations is thus unrestricted as regards direction of transmission and its improved isotropy enhances its general transmission characteristics.

According to the present invention, a method of improving the isotropy of vitreous silica comprises heating a piece of vitreous silica to a temperature of between 950° and 1250° C. and subjecting the silica piece to an alternating electric field of a freqeuncy of less than 1,000 cycles/second but more than 1 cycle/second at a field strength of not less than 900 volts (R.M.S.) per centimetre.

The field strength may be increased considerably above the figure of 900 volts (R.M.S.) per centimetre. In general, we prefer to work at the maximum possible field strength and in general this is about 1500 volts (R.M.S.) per centimetre. The limit to the field strength obtainable, is normally set by the equipment available and the possibility of arcing across the silica piece.

A convenient A.C. frequency is 50 or 60 cycles per second but multiples of 50 or 60 cycles per second or any other conveniently available frequency may be employed.

The times required for achieving a desired degree of disorder by the method according to the invention will depend on the temperature of the silica piece, on the A.C. field established across it and to a lesser extent on the frequency applied. Process times of at least 24 hours would be typical.

The method in accordance with the invention may be used as a substitute for the known D.C. electrolysis or it may be a subsequent process stage after D.C. electrolysis.

Although the method of the invention has particular application to the production of material for delay lines, the improved isotropy which results from the method affords useful advantages in other applications as well.

What is claimed is:

1. A method for improving the isotropy of vitreous silica comprising the steps of heating said vitreous silica to a temperature of between 950° and 1250° C.; and applying to the heated silica an alternating electric field having a frequency between 1 cycle/second and 1000 cycles per second and a field strength exceeding 900 volts (R.M.S.) per centimeter.

2. The method for improving the isotropy of vitreous silica as defined in claim 1 wherein the field strength of said alternating electric field is less than 1500 volts (R.M.S.) per centimeter.

3. The method for improving the isotropy of vitreous silica as defined in claim 1 wherein the frequency of said alternating electric field is a multiple of 50 cycles per second.

4. The method for improving the isotropy of vitreous silica as defined in claim 1 wherein the frequency of said alternating electric field is a multiple of 60 cycles per second.

5. The method for improving the isotropy of vitreous silica as defined in claim 1 including the step of applying to said silica a unidirectional electric field prior to applying said alternating electric field to said silica.

6. The method for improving the isotropy of vitreous silica as defined in claim 1 wherein the frequency of said alternating electric field is a multiple of 50 and 60 cycles per second.

7. The method for improving the isotropy of vitreous silica comprising the steps of heating said vitreous silica to a temperature between 950° and 1250° C.; and applying to the heated silica an alternating electric field with the frequency of the field being a multiple of 50 and 60 cycles per second and the field strength being between 900 and 1500 volts (R.M.S.) per centimeter.

References Cited

UNITED STATES PATENTS 3,278,844  10/1966  Bell.
2,897,126   7/1959  George.
3,174,919   3/1965  Spremulli _____ 65—30

S. LEON BASHORE, Primary Examiner

E. R. FREEDMAN, Assistant Examiner

U.S. Cl. X.R.

65—33; 333—30